United States Patent
Curtis et al.

(10) Patent No.: US 11,379,398 B2
(45) Date of Patent: Jul. 5, 2022

(54) VIRTUAL PORTS FOR CONNECTING CORE INDEPENDENT PERIPHERALS

(71) Applicant: Microchip Technology Incorporated, Chandler, AZ (US)

(72) Inventors: Keith Edwin Curtis, Queen Creek, AZ (US); Stephen Matthew Cowden, Queen Creek, AZ (US)

(73) Assignee: Microchip Technology Incorporated, Chandler, AZ (US)

(*) Notice: Subject to any disclaimer, the term of this patent is extended or adjusted under 35 U.S.C. 154(b) by 0 days.

(21) Appl. No.: 16/550,648

(22) Filed: Aug. 26, 2019

(65) Prior Publication Data
US 2020/0387466 A1 Dec. 10, 2020

Related U.S. Application Data

(60) Provisional application No. 62/857,036, filed on Jun. 4, 2019.

(51) Int. Cl.
*G06F 13/40* (2006.01)

(52) U.S. Cl.
CPC ................ *G06F 13/4022* (2013.01)

(58) Field of Classification Search
None
See application file for complete search history.

(56) References Cited

U.S. PATENT DOCUMENTS

| | | | |
|---|---|---|---|
| 6,795,448 B1* | 9/2004 | Lee ...................... | H04M 7/006 379/399.01 |
| 6,829,727 B1* | 12/2004 | Pawloski ............ | G06F 11/3652 703/28 |
| 7,076,420 B1* | 7/2006 | Snyder ................ | G06F 11/3656 703/28 |
| 7,185,138 B1* | 2/2007 | Galicki .................. | H04L 49/15 710/316 |
| 8,160,864 B1* | 4/2012 | Nemecek ............ | G06F 11/3656 703/28 |
| 8,751,729 B2* | 6/2014 | Mun .................... | G06F 12/0246 711/103 |
| 8,848,456 B2* | 9/2014 | Han ....................... | G11C 16/16 365/185.29 |
| 9,432,298 B1* | 8/2016 | Smith ................. | H04L 49/9057 |
| 10,192,592 B2* | 1/2019 | Shu ....................... | G11C 7/1048 |
| 11,129,308 B1* | 9/2021 | Cheng ................ | H05K 7/20727 |

(Continued)

FOREIGN PATENT DOCUMENTS

WO 2015/188048 A1 12/2015 ............. G06F 15/78

OTHER PUBLICATIONS

International Search Report and Written Opinion, Application No. PCT/US2019/052826, 15 pages, dated Jan. 17, 2020.

*Primary Examiner* — Henry Tsai
*Assistant Examiner* — Christopher A Bartels
(74) *Attorney, Agent, or Firm* — Slayden Grubert Beard PLLC

(57) ABSTRACT

A microcontroller has a central processing unit and a plurality of peripheral units and a plurality of port bit circuits provided through at least one input/output port. At least one port bit circuit of the plurality of port bit circuits is not connected to an external pin and the at least one port bit circuit is configurable to route a signal received at the port bit circuit to a selected peripheral of the microcontroller.

21 Claims, 6 Drawing Sheets

(56) References Cited

U.S. PATENT DOCUMENTS

| | | | |
|---|---|---|---|
| 2006/0168429 A1* | 7/2006 | Short | G06F 15/7814 |
| | | | 712/228 |
| 2007/0283052 A1 | 12/2007 | Wojewoda et al. | 710/2 |
| 2009/0057915 A1* | 3/2009 | Koike | H01L 24/49 |
| | | | 257/777 |
| 2010/0228926 A1* | 9/2010 | Maheshwari | G11C 7/1075 |
| | | | 711/149 |
| 2010/0238003 A1* | 9/2010 | Chan | G01D 4/004 |
| | | | 340/538 |
| 2013/0024605 A1* | 1/2013 | Sharon | G06F 11/1044 |
| | | | 711/103 |
| 2013/0080677 A1* | 3/2013 | Simmons | G06F 13/4068 |
| | | | 710/316 |
| 2014/0104935 A1* | 4/2014 | Ware | G11C 7/1087 |
| | | | 365/154 |
| 2014/0211894 A1* | 7/2014 | Yang | H04L 25/4902 |
| | | | 375/354 |
| 2015/0026545 A1* | 1/2015 | Yu | H03M 13/152 |
| | | | 714/780 |
| 2015/0143037 A1* | 5/2015 | Smith | G06F 3/0659 |
| | | | 711/103 |
| 2015/0357009 A1* | 12/2015 | Sinangil | G11C 7/106 |
| | | | 365/156 |
| 2016/0179738 A1* | 6/2016 | Guddeti | G06F 13/24 |
| | | | 714/56 |
| 2016/0344629 A1* | 11/2016 | Gray | H04L 49/106 |
| 2017/0220502 A1* | 8/2017 | Kessler | G06F 13/404 |
| 2018/0096971 A1* | 4/2018 | Pappu | H01L 25/0657 |
| 2018/0096979 A1* | 4/2018 | Pappu | H01L 22/32 |
| 2018/0191523 A1* | 7/2018 | Shah | G06F 13/40 |
| 2018/0279429 A1* | 9/2018 | Sadwick | H05B 45/3725 |
| 2018/0317826 A1* | 11/2018 | Muhsin | G06F 13/385 |
| 2019/0042195 A1* | 2/2019 | Kalsi | G06F 17/12 |
| 2019/0096476 A1* | 3/2019 | Chen | G11C 5/14 |
| 2019/0103914 A1* | 4/2019 | Junk | H04L 69/08 |
| 2019/0176837 A1* | 6/2019 | Williams | B60W 50/02 |
| 2020/0106743 A1* | 4/2020 | Park | H04L 63/308 |
| 2020/0257517 A1* | 8/2020 | Seater | G06F 1/3287 |
| 2022/0047178 A1* | 2/2022 | Rogers | A61B 5/0006 |

* cited by examiner

VIRTUAL PORTS FOR CONNECTING CORE INDEPENDENT PERIPHERALS

RELATED APPLICATION

This application claims priority to U.S. Provisional Patent Application No. 62/857,036 filed Jun. 4, 2019, the contents of which are hereby presented in their entirety.

TECHNICAL FIELD

The present disclosure relates to microcontrollers comprising I/O ports and core independent peripherals (CIPs) and, more particularly, their interconnection.

BACKGROUND

A microcontroller generally comprises a central processing unit (CPU), program and data storage memory, input-output (I/O) ports and a plurality of peripherals fabricated on an integrated circuit (IC) die ("chip"). Some of these peripherals may be core independent peripherals (CIPs), which are defined as peripherals that may operate without requiring input from the CPU. The IC die may be enclosed (encapsulated) in an IC package having connection terminals ("pins") to which external circuits may be connected to the IC die. Electrical connection points on the IC die may be "pads" and may be connected to the IC package pins with bonding wires. Most of the external connection pins are associated with an I/O port of the microcontroller, wherein each I/O port pin is fixedly associated with one bit of an I/O port. Respective IC die pads are used for these I/O ports and wire bonded to the respective external pins. Other external pins provide IC die DC power and ground. The I/O port pins are often so-called multi-function pins and can be shared under program control with a peripheral. To this end, certain predefined associations may exist for each pin or a so-called peripheral port selection (PPS) logic may allow for selection of a variety of assignable peripheral functions.

Core independent peripherals (CIP) are designed to handle their tasks with no code execution by or supervision from a central processing unit (CPU) to maintain operation thereof. As a result, they simplify the implementation of complex control systems and give designers the flexibility to innovate. CIPs are internally integrated and receive inputs from internal and external sources and may provide outputs to internal and external targets, such as other integrated peripherals or external components. However, not all core independent peripherals (CIPs) have all of their input and/or output connections available to every other CIP, but they may have one or more connection only available to respective external pins. To make connections between different CIPs that are not within the normal internal selection options, it is necessary to make that connection using an external port pin. On low pin count devices this may be problematic as it might cause a lock/reduction of available port pins. Therefore, a larger device must be used with a respective number of extra port pins. The main drawbacks are cost and size of the larger device. The other option is to significantly increase the connection selection register and associated multiplexer circuitry for all CIPs to allow selection of any of the other CIPs for connection thereto which in most cases is not a viable option.

As mentioned above, I/O ports are used for external digital I/O of a microcontroller. They are fixedly assigned to an external pin. Depending on the number of external pins that are available, a respective number of I/O ports can be implemented. These I/O ports are generally not considered to be peripherals but rather provide for an external digital interface directly controlled by the CPU. This description distinguishes the term "I/O port" as not being equivalent to any peripheral device or module within a microcontroller. Their primary port I/O function can be overridden in a configuration process so that the associated external pin is then controlled by a selected peripheral. The peripheral(s) may be, for example but not limited to, a PWM module, a timer, digital-to-analog converter (DAC) or analog-to-digital converter (ADC), instead of the I/O port. For example, once re-assigned, the pin may now serve as an analog input pin for an ADC or an output pin for a serial interface. Ports are often available as 8-pin or 16-pin ports denominated as Port A, B, C, etc., however, in particular on low pin devices, each port or only a single port may have less individual bits and on other devices may also have more individual bits. For example, a 6-pin microcontroller may have only a single port with 4 bits, e.g., PORTA0, PORTA1, PORTA2, and PORTA3 and a 14-pin microcontroller may have only two ports, for example, PORT A and PORT C with individual bits PORTA0-PORTA5 and PORTC0-PORTC5. Other configurations are possible.

SUMMARY

Therefore, what is needed, in particular, for microcontrollers having a low number of external pins, is the possibility to route signals internally without a significant increase of multiplexer circuitry.

According to an embodiment, a microcontroller comprises a central processing unit and a plurality of peripheral units and a plurality of port bit circuits provided through at least one input/output port, wherein at least one port bit circuit of the plurality of port bit circuits is not connected to an external pin and wherein the at least one port bit circuit is configurable to route a signal received at the port bit circuit to a selected peripheral of the microcontroller.

According to a further embodiment, any port bit not connected to an external pin may be initially disabled and can be re-enabled through configuration. According to a further embodiment, the microcontroller may comprise a configurable fuse for re-enabling of a port bit. According to a further embodiment, the at least one port bit can be connected with a die pad. According to a further embodiment, the input signal can be provided by a bit of a bit register latch. According to a further embodiment, the at least one port bit circuit may comprise a first multiplexer configured to select the signal. According to a further embodiment, the microcontroller may further comprise a selection circuit comprising a multiplexer controlled by a first register and configured to select the signal. According to a further embodiment, the at least one port bit circuit may comprise a second multiplexer configured to select a destination for the signal. According to a further embodiment, the second multiplexer can be controlled by a second register and is configurable to assign the at least one port bit circuit to a selected peripheral of the microcontroller. According to a further embodiment, the microcontroller may further comprise at least one another I/O port circuit comprising a plurality of bits, wherein at least some of the plurality of bits are assigned to external pins of the microcontroller.

According to another embodiment, a method for operating a microcontroller comprising a central processing unit and a plurality of peripheral units and a plurality of port bit circuits provided through at least one input/output port, wherein at least one port bit circuit of the plurality of port bit circuits is not connected to an external pin, may comprise: selecting a signal source for the at least one port bit circuit; selecting a destination for the at least one port bit circuit, whereby the at least one port bit circuit routes a signal from the selected signal source received at the at least one port bit circuit to a selected peripheral of the microcontroller.

According to a further embodiment of the above method, any port bit not connected to an external pin may be initially disabled, the method further comprising: configuring the microcontroller through at least one configuration register to enable the at least one input/output port. According to a further embodiment of the above method, the selected input signal source can be a port latch of the at least one port bit circuit, the method further comprising: writing a value into the port latch by the central processing unit to provide an input signal for the selected output source. According to a further embodiment of the above method, selecting the input source and/or selecting the destination can be performed through programming of registers, wherein the registers control a first multiplexer selecting the signal source and a second multiplexer selecting the destination. According to a further embodiment of the above method, the microcontroller may comprise a programming/debugging interface coupled with the at least one port bit circuit, the method further comprising: coupling an in-circuit emulator/debugger device to the programming/debugging interface of the microcontroller; detecting logic states of the signal within the at least one port bit circuit; and forwarding the logic states to the in-circuit emulator/debugger device.

According to yet another embodiment, a microcontroller may comprise a central processing unit, a plurality of peripherals and a plurality of input/output ports, wherein at least one of the input/output ports comprises a plurality of bits connected to external pins of the microcontroller, and wherein at least one port bit circuit of the plurality of input/output ports is not connected to an external pin and wherein the at least one port bit circuit is configurable to route a signal received at the port bit circuit to a selected peripheral of the microcontroller, wherein any port bit not connected to an external pin is initially disabled and can be re-enabled through configuration, wherein the at least one port bit circuit comprises an first multiplexer configured to select the signal and wherein the first multiplexer is coupled with a bit of a port latch register and with outputs of a plurality of peripherals of the microcontroller.

According to a further embodiment, the microcontroller may comprise a configurable fuse for re-enabling of a port bit. According to a further embodiment, the at least one port bit can be connected with a die pad. According to a further embodiment, the first multiplexer can be controlled by a configuration register and configured to provide the input signal. According to a further embodiment, the at least one port bit circuit may comprise a second multiplexer configured to select a destination for the input signal.

BRIEF DESCRIPTION OF THE DRAWINGS

A more complete understanding of the present disclosure may be acquired by referring to the following description taken in conjunction with the accompanying drawings wherein.

DETAILED DESCRIPTION

Figure 1A:
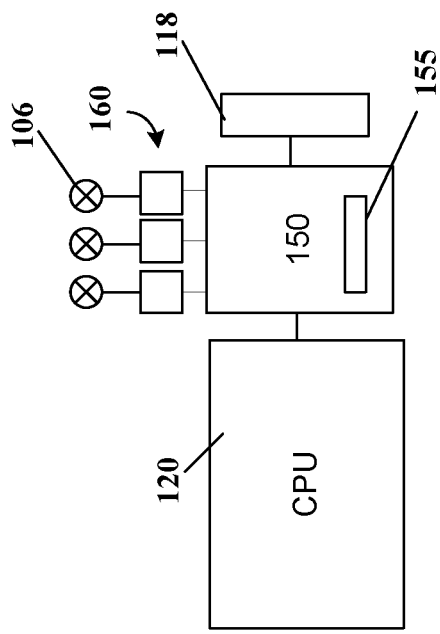
FIG. 1a shows in more detail logic circuitry to enable/disable an unused I/O port.

Small or low pin count microcontrollers, e.g., 6 or 8 pin microcontrollers, typically are built using the same IC die as is used in higher pin count devices, e.g., 14 pins, which means that unused port logic is present, but initially disabled. Disablement of such unused ports may be accomplished by internal wire-bonding or by fuses or any other suitable means. According to various embodiments, such a disablement may be overwritten or may be not established during manufacturing so that these ports while externally unconnected are yet active. Other embodiments of the present disclosure allow active overwriting of the disablement thereby enabling these unused ports to provide internal interconnections between internal peripherals that are otherwise not possible. Enablement of such an unused port ("virtual port") may be accomplished with a fuse bit in a configuration register that would override the, for example, typical wire bond disable mechanism in the die and allow creation of virtual connection ports within the device for making internal connections and virtual test points as well. The term "virtual port" as used herein for this disclosure is defined as a port that is not accessible external to the IC package. A "virtual port" may typically comprise 8 port bits and respective input/output circuitry may be implemented as will be explained in more detail below. However, a "virtual port" may be designed to only have a single port bit or more than 8 bits. In the following a port bit circuit designates an input/output circuit for one bit of an I/O port or "virtual port".

Embodiments of the present disclosure may comprise a set of, for example but not limited to, 8-24 connection points (port bits) that may be used to connect peripherals or CIPs, in particular, in low pin count devices. Further these ports are accessible by a circuit emulator or an in-circuit debugger (ICD), which would allow display of data in a logic analyzer function build, for example, into the MPLAB® X integrated development environment (IDE) manufactured by the assignee of the present application. This also allows for the creation of override and drive inputs, under software control, for peripheral/CIP configurations.

Advantages of using "virtual ports" may be reduced data size for transmission over the conventional input selection multiplexer, an increase in the number of possible peripheral or CIP interconnections, the ability to allow software input of signals to the peripherals or CIPs where a logic analyzer may be used to display these signals, and die size may remain substantially the same.

Currently, as mentioned above, unused ports are disabled using, for example, a bonding option when the die is mounted in the integrated circuit package as will be explained in more detail below. According to specific example embodiments of this disclosure, one or more fuses in the configuration words may be used to over-ride this disablement, re-enable all available ports or re-enable individual disabled port bit circuits. These fuses are resettable and programmed during a programming of the device, for example, using configuration registers. Little or no additional cost is required as the hardware is present on the die in these embodiments. It may use an additional configuration bit and the associated logic to re-enable the desired port pin. It may also use a modification to the assembler and compiler tools to re-enable the port, pin, and register aliases.

As used herein a port bit may be connected to an internal connection pad on an integrated circuit die comprising a plurality of peripherals or CIPs and a CPU. A port bit may connect to an external integrated circuit pin for further connection to circuits outside of the integrated circuit package. According to the present description, a port or port bit is also considered as a "virtual port" or "virtual port bit" if it is not connected to an external pin.

Referring now to the drawings, the details of example embodiments are schematically illustrated. Like elements in the drawings will be represented by like numbers, and similar elements will be represented by like numbers with a different lower-case letter suffix.

Figure 1:
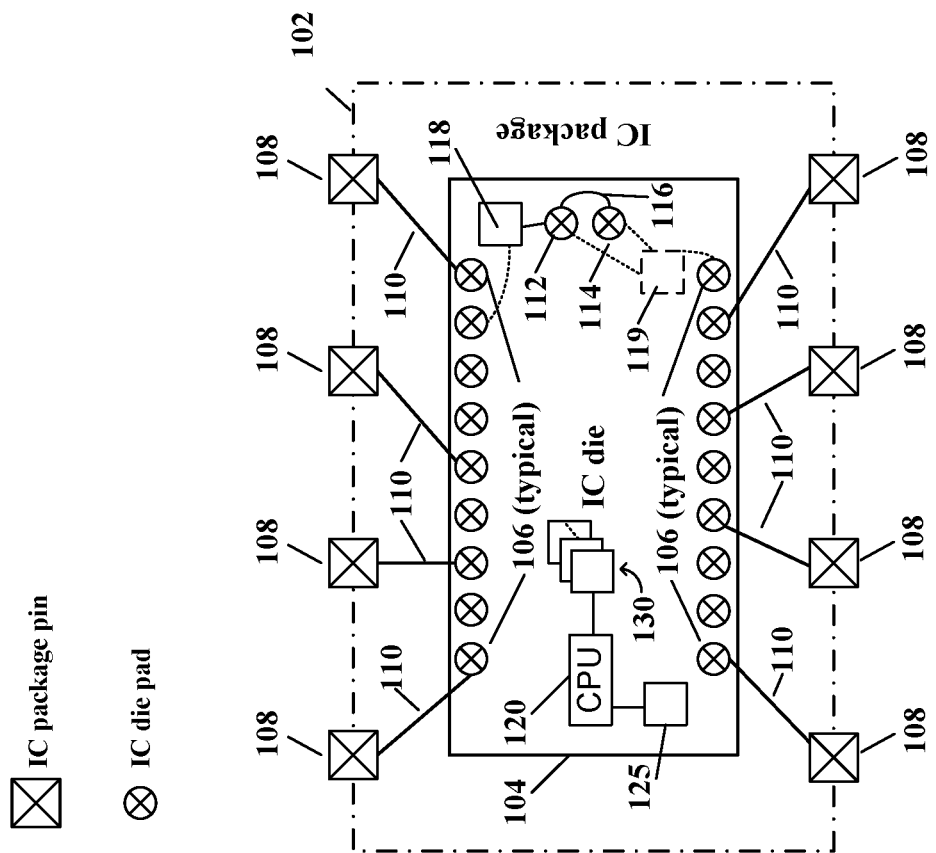
FIG. 1 illustrates a schematic plan view of an integrated circuit die in an integrated circuit package, according to the teachings of this disclosure.

Referring to FIG. 1, depicted is a schematic plan view of an integrated circuit die in an integrated circuit package, according to the teachings of this disclosure. An integrated circuit (IC) die 104 comprises a central processing unit (CPU) 120 and a plurality of peripherals 130 as well as a memory 125 and a plurality of I/O ports forming a microcontroller. The IC die 104 has a plurality of connection pads 106, 112, 114 thereon that may be configured as ports, a dedicated function, or power supply. These ports may be programmed to be coupled to selected IC die circuits, e.g., peripherals 130, which peripheral 130 may be CIPs. Some of the pads 106 are used to connect to power (VDD) and ground (VSS) necessary for the IC die circuits. Some of the pads 106 may be connected to external pins 108 on an IC package 102 with bond wires 110. Typically, there are more pads 106 than external pins 108 in a low pin microcontroller. However, certain embodiments may have the same number of pads as external pins. In such devices "virtual ports" may be implemented but do not have an associated pad on the IC die as will be explained in more detail below.

FIG. 1 show a plurality of pads 106 that are not connected to external pins. These externally unconnected pads 106 may be internally coupled with respective I/O ports for use in higher pin housings as explained above. In an embodiment that uses one way of wire-bonding for disabling the unused ports, FIG. 1 shows additional first and second pads 112 and 114. The die 104 may include stored data defining which pads are not used in various housing options. First pad 112 may have decoding logic 118 connected using a pull-up resistor and second pad 114 may be connected to ground. A wire-bond 116 connects the first and second pads 112 and 114, as a result the first pad 112 may be pulled to ground and the decoding logic 118 will in response disable those I/O ports associated with the unconnected pads 106 according to the stored data. A plurality of pads 112 and associated disablement data defining the I/O ports to be disabled may exist to allow for a variety of predefined ports to be disabled according to different variations of the respective microcontroller. Disablement by wire-bonding as shown in FIG. 1 is only one way, other disabling means such as fuses 119 indicated by the dashed lines may be used. For example, fuse may be coupled between pads 112 and 114 to serve the same function as the wire 116. The fuses 119 may be set or reset according to a predefined definition. Alternatively, decoding logic 118 may be implemented for each potentially unconnected pad 106 that is associated with an I/O port as indicated in FIG. 1 by the dotted line between an unused pad 106 and logic 118. However, such a solution would require to apply bonding wires between each unused pad and a ground pad. Alternatively, each potentially unused pad may have an associated fuse for disablement of the associated I/O port as indicated by the dotted line between an unused pad 106 and fuse 119. The one or more fuses 119 may be resettable and are usually set during configuration of the device. The only requirement for disabling the ports according to various embodiments is that such a disablement can be overwritten and therefore is not permanent.

FIG. 1*a* shows a more detailed block diagram of the enablement circuitry. Only three externally unconnected pads 106 are shown. Each pad 106 is coupled with an associated I/O bit port circuit 160 as will be explained in more detail below. Logic circuit 150 is configured to enable or disable each I/O port circuit 160 depending on logic signals received from decoding logic 118. Disablement can be accomplished by simply not powering the respective I/O bit port circuit. However, forms of disablement may be provided such as blocking any control and data signals. Shutting down power for the circuits 160, however, avoids unnecessary power consumption. Logic circuit 150 may comprise configuration registers to allow re-enablement of a disabled I/O-port 160. For example, according to an embodiment, logic circuit 150 may comprise special function registers 155 that store which ones of the I/O port circuits are initially disabled. CPU 120 may be programmed to overwrite this initial setting stored in registers 155. Alternatively, dedicated instructions may be used to re-enable the previously disabled I/O port circuits 160.

Figure 2:
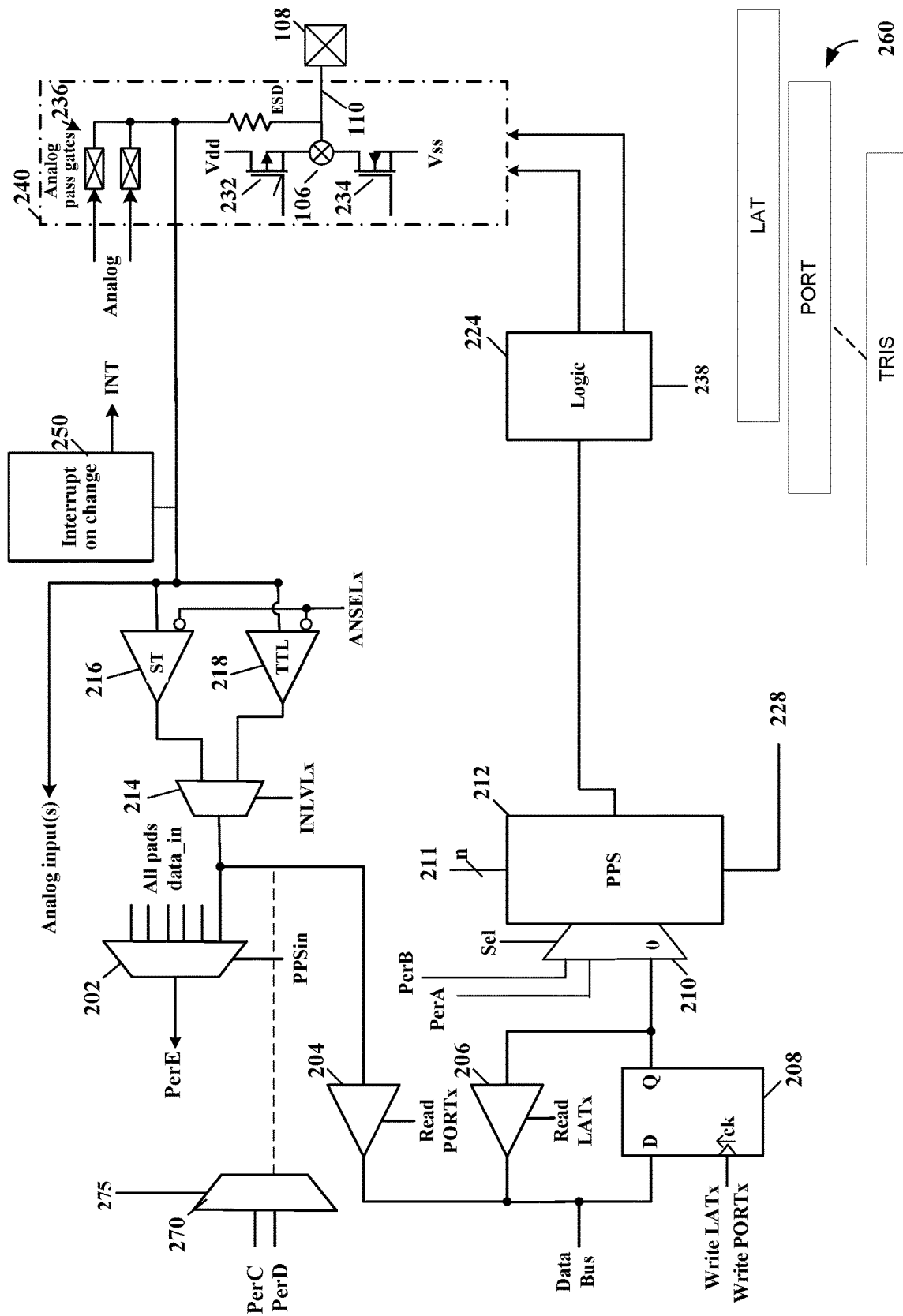
FIG. 2 illustrates a schematic block diagram of a CIP port coupled to a hardware input-output pad.

Referring to FIG. 2, depicted is a schematic block diagram of an I/O port coupled to a hardware input-output pad 106 and to an external pin 108. The I/O pad 106 may be configured as a digital input or output, an analog input or output, and may be tristate, open collector, or an analog driver. The output section is shown in the lower portion of FIG. 2 while the input section of a port bit circuit is shown in the upper half. Only one bit is shown in FIG. 2, however, as mentioned before, a port may include more than one bit, and typically has 8 or 16 bits and in low pin devices may have any number of bits. Thus, the term "port" and "port bit" are used interchangeable in this description as a port may be designed to only have a single bit. The configuration of the basic digital I/O function of I/O pad 106 and pin 108 may be selected by signals from a configuration register 260. The configuration register 260 may include separate or combined registers for controlling the tri-state (indicated in the register set 260 as register TRIS), up and/or down pull function, analog input selection, output and input values (indicated in the register set 260 as register LAT and PORT, respectively) and other configuration parameters. Tristate signal control signal TRISx may be generated through an associated bit of register TRIS and fed to logic circuit 224 comprising the drivers for output stage 240 and generating control signals for transistors 232 and 234. Logic circuit 224 may include controllable drivers for the transistors 232 and 234 and signal TRIS may be used to disable these drivers thereby controlling a tristate function of driver stage 240. If programmed as an output port, bit register latch 208 provides for the basic digital output function for the CPU for a bit presented on a data bus to the D input of bit register latch 208. Multiplexer 210 is then set to input 0 through signal Sel. Multiplexer 210 conventionally only comprises a few, for example as shown in FIG. 2, three predefined inputs that allows to operate pin 108 as a multi-function pin. For example, pin 108 may operate as a digital I/O pin, a serial data output pin of a first peripheral PerA, a timer output pin for second peripheral PerB, or an analog input pin which is usually the default setting. More or less combination may be possible, however conventional designs are usually limited in the number of possible predefined selections. Each multi-function pin 108 has usually a different predefined selection set. The selection is usually made automatically when the respective peripheral is configured by software. For example, if a serial port peripheral is enabled, the I/O port circuit of a respective associated multi-function pin 108 will be controlled through signal Sel to select the respective input associated with the respective peripheral.

According to some embodiments, a first Peripheral pin select unit (PPS) 212 expands the functionality of such a conventional multiplexer and allows to assign various other outputs of various peripherals for use with pin 108, for example, through n input lines 211. Configuration of the PPS is however not performed automatically, rather the first PPS 212 comprises programmable registers as will be explained in more detail in FIG. 3 which allow to select a predefined number of output signals from various peripherals to be routed to pin 108. A more complete description of a PPS is available in section 10.4 of "dsPIC33E/PIC24E Family Ref. Manual, Sect. 10 /I/O Ports", 2009-2013, available from Microchip Technology Inc. which is hereby incorporated by reference in its entirety.

As mentioned above, the first PPS 212 provides for more output choices from a variety of peripherals through lines 211 than a conventional multiplexer which is usually limited to only a few choices. A peripheral pin select unit also may provide additional input selection as will explained in more detail below with respect to multiplexer 202 forming a second PPS. A PPS such as the first PPS 212 can be simply interpreted as an expanded multiplexer controlled by configuration registers (not shown). Its main purpose is the same as that of multiplexer 210, namely to route various internal output signals to driver stage 240. FIG. 2 just shows one embodiment of a I/O port circuitry. Other more or less complex I/O port circuitry may be used to control the I/O function of an external pin 108.

According to one embodiment, multiplexer 210 routes the output signal of bit register latch 208 through logic 224 to the output driver stage 240 which may include a pair of driver MOSFETs 232 and 234 arranged to drive pad 106 and external pin 108 to logic high or low. Logic 224 may be included in the driver stage or may optionally be implemented to further allow for example an open-drain function and/or provide for weak or strong pull-up and/or pull-down resistors of this port corresponding to a setting in the configuration registers 260 through control signal 238. Output driver stage 240 may optionally provide for one or more analog pass gates 236 to provide an additional analog output function for pad 106/pin 108. As shown in FIG. 2, according to one embodiment, Multiplexer 210 may have two additional inputs coupled with a peripheral PerA and PerB, respectively allowing for a basic multi-function pin. Depending on the control signal SEL provided through the peripherals, the multiplexer 210 selects either the bit register latch 208 or one of the other inputs to allow output control of a peripheral. The first PPS 212 may be optionally implemented which allows for a further selection of various peripheral output function to be selected by multiplexing the output of multiplexer 210 with the additional signals 211. First PPS 212 is controlled by signal 228 that is generated through logic (not shown) decoding a setting in the associated configuration registers (not shown in FIG. 2)

The input functionality/section is controlled by drivers 204, 216, 218, and multiplexers 202 and/or 270, and 214. Signal ANSELx disables drivers 216 and 218 to operate pad 106/pin 108 as an analog input port. Multiplexer 214 selects between Schmidt trigger driver 216 and TTL driver 218 responsive to a control signal INLVLx, which may provide TTL or a Schmidt trigger input, responsive to the selected one of drivers 216, 218. According to various embodiments, only one of these drivers are implemented. Multiplexer 202 forms part of a second PPS and is a responsive to a control signal PPSin provided through a plurality of input assignment registers (not shown in FIG. 2) and may be provided to allow usage of pad 106/pin 108 as an input pin for a wider selection of specific peripheral similar to the first PPS. Multiplexer 202 provides inputs for a plurality of other pads and associated IO/port circuitry and provide a single output signal for one peripheral PerE. Depending on the number of peripherals that may require an input signal, a plurality of such multiplexers 202 may be implemented in the second PPS. Alternatively, or in addition, as shown by the dashed line, a conventional multiplexer 270 may be implemented that allows for routing the input signal from pad 106/pin 108 to a selected peripheral similar to multiplexer 210. A more complex description of the input PPS is available in document "dsPIC33E/PIC24E Family Ref. Manual, Sect. 10 /I/O Ports" mentioned above. Multiplexer 270 may be controlled by signal 275 selecting one of its multiple outputs to be coupled with its input which is connected either with the output of multiplexer 214 or directly with pad 106/pin 108. Similar to multiplexer 210 this multiplexer 260 is controlled by signal 275 provided by the peripherals PerC and PerD when a selected peripheral PerC or PerD assigned to the multi-function pin 108 is configured.

The basic digital input function for the CPU is provided by driver 204, which drives its output onto the data bus responsive to a received Read PORTx control signal. In addition, a user may also read the output of the bit register latch 208 through driver 206, which is similarly arranged to drive its output onto the data bus responsive to a received Read LATx control signal. FIG. 2 shows a variety of port functions and configurations. Despite the basic digital I/O function provided by bit register latch 208 and driver 204 as well as the basic driver stage 240, other functions may be individually added or omitted depending on the implementation and the desired multi-functions of the respective port. Output stage 240 may also provide for ESD protection as shown in FIG. 2. The port may further optionally provide for an Interrupt on change functionality through detection circuit 250 that may generate an interrupt INT to the CPU.

Figure 3:
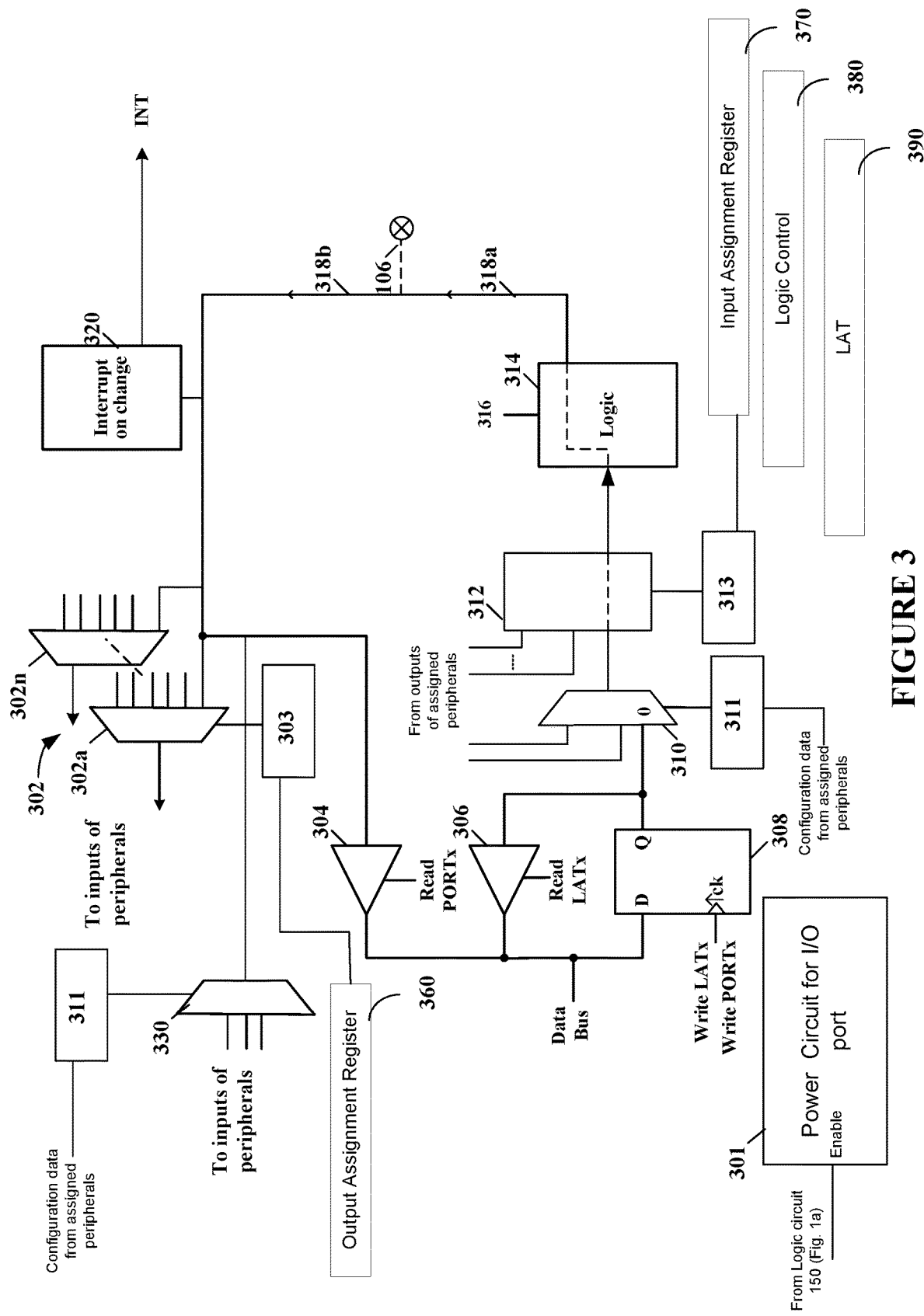
FIG. 3 illustrates a schematic block diagram of a virtual CIP port, according to specific example embodiments of this disclosure.

Referring to FIG. 3, depicted is a schematic block diagram of a "virtual port" circuit for a single bit, for example, representing circuit 160 in FIG. 1a, according to specific example embodiments of this disclosure. However, the general port design may also be identical to the port design as shown in FIG. 2 with the exception that no external pin is connected via pad 106. FIG. 3 shows certain parts of the port bit circuitry that may be used when this port is enabled as a "virtual port". In some embodiments, as indicated with the dashed connection line, no pad 106 may physically be connected with output/input line 318 (shown as 318a and 318b). The "virtual port" circuit shown in FIG. 3 may therefore not physically be coupled to an I/O pad 106 but still has the functionality of being connected to a "virtual port". The "virtual port" circuit, while not being connected to an external pin is used as a routing means to switch internal signals to peripherals that are otherwise not available internally. Thus, in a "virtual port circuit", output signals may now be considered as input signals and input signals as output signals. Signal conditioning logic 314 controlled by signal 316 may also be omitted according to some embodiments. If present, the signal conditioning logic 314 may be permanently configured to provide standard output function, such as slew control, pull-up, pull-down, open drain functionality. However, configuration of signal conditioning logic 314, to provide pull-up, pull down, and open drain functionality may be used for the "virtual port" according to some embodiments similar to the logic circuit 224 in FIG. 2. In other embodiments, analog signal, tri state and pull-up control provided by signal conditioning logic 314 may not be required, nor are port driver and TTL/ Schmidt trigger as used in FIG. 2 required. If these are present, their functionality may therefore be disabled or the most suitable one may be selected. If a microcontroller design is dedicated to a specific number of external pins, unused ports may not be present and a minimum configuration of a "virtual port" may be implemented with or without a pad 106 omitting those circuitries that are only required when an actual external pin is connected to the port.

According to one embodiment, multiplexers 310, 330 can be used for connecting various peripherals together. A first multiplexer 330 corresponds to multiplexer 270 in FIG. 2 and a second multiplexer 310 corresponds to multiplexer 210. Again, these multiplexers 330, 310 are automatically controlled by a logic circuit 311 to select input or output signals when respective peripherals are configured as explained above. FIG. 3 shows that logic circuit 311 receives configuration control data from a respective peripheral assigned to the specific "virtual port" circuit.

Instead or in addition, a PPS as shown with first and second PPS 212, 202 in FIG. 2 may provide for an expanded selection of peripherals providing a signal and of peripherals for receiving the selected signal. In particular, a PPS may be the preferred method for routing signals through a "virtual port" internally between different peripherals as its configuration is controlled by registers rather than automatic control by configuration of a peripheral.

To this end, FIG. 3 shows a first PPS 302 comprising a plurality of multiplexers 302a . . . n each comprising an output coupled with a different peripheral. The multiplexers 302a . . . n are controlled by logic circuit 303 configured to decode a setting of output assignment registers 360. Each multiplexer 302a . . . n may be associated with one output assignment register 360 or an output assignment register 360 may be configured to provide setting information for multiple multiplexers 302a . . . n. Thus, a signal received on line 318a,b will be routed through multiplexers 302a . . . n to an input of a selected peripheral.

A bit register latch 308 and drivers 304, 306 for software input of control signals to the selected peripheral may be implemented if desired. According to some embodiments, bit register latch 308 and drivers 304, 306 may not be implemented. Also, a port interrupt on change provided by circuit 320 may be a desired feature, according the teachings of this disclosure. Any of the desired functionality may be implemented according to various embodiments. Thus, if a port is already available and in a conventional device would be disabled, the re-enablement of such a port may use any function it supports for routing signals to a peripheral.

FIG. 3 shows power supply circuit 301 which provides power to the various components of the "virtual port"- circuit. This allows to disable each bit of a "virtual port" individually by controlling the respective power supply. Power supply circuit 301 receives one or more signals from logic circuit 150 (shown in FIG. 1a). Disabling and re-enabling of the various "virtual port" circuits is optional. According to one embodiment, all I/O port circuits not connected with an external pin are initially disablement, for example by not supplying them power and can be re-enabled through logic circuit 150 as explained above. According to some embodiments, all I/O ports are initially enabled and can be disabled through software, for example if not required in a particular application. According to other embodiments, all I/O port circuits are always enabled.

At a minimum a "virtual port" circuit would use a multiplexer 330 or a PPS 302 for selecting the "virtual port" signal provided on line 318a, b. For selection of the "virtual port" signal, at a minimum either a bit register latch 308 and/or another multiplexer circuit is provided. This multiplexer circuit either comprises multiplexer 310 and/or PPS 312. Again, multiplexer 311 is controlled by control logic 311 receiving configuration data from assigned peripherals to automatically select a respective peripheral when it has been configured. PPS 312 comprises a multiplexer controlled by logic circuit 313 which decodes a respective output assignment register 370. Output assignment register 370 is associated with the specific "virtual port circuit" and its stored information defines which output signal of which peripheral is to be selected by the multiplexer of PPS 312. Drivers 304 and/or 306 may be used for debugging, in particular for providing a logic analyzer function through the integrated programming/debugging interface. For example, driver 304 allows to read a logic state of line 318a, b and driver 306 allows to read a current output logic state of latch 308.

FIG. 3 also shows some exemplary further control registers 380, and 390 to control the "virtual port" directly via the CPU. Each bit of the logic control register 380 and latch register 390 may control a different bit of the "virtual port". For example, a single bit in latch register 390 corresponds to bit register latch 308. In an embodiment in which logic circuit 316 is used and, for example, controls a pull-up function, a single bit of register 380 directly controls this function through line 316. The respective other bits in registers 380, 390 control respective other port circuits. The output assignment register 360 and the input assignment register 370 as explained above are not bit organized registers like registers 380, 390. They are typically registers of the plurality of configuration registers of the peripheral pin selection circuits 302 and 312 and are therefore organized differently. As stated above, the input assignment register 370 may be configured to define a selected input signal source by writing a respective code word into the register 370. For example, one of 16 different input signal sources routed to the multiplexer of PPS 312 may be defined if 4 bits are used. Thus, these four bits are routed to respective logic 313 that controls PPS 312. An 8-bit register may assign one of 256 different input sources to the respective port bit. The input assignment register 370 may thus be designed depending on the number of available input signals.

The output assignment register 360 may be designed to be associated with a single peripheral input and thus, a value stored in such a register may define the respective port bit circuit. According to one embodiment, 16 multiplexers 302a . . . n may be present in the input PPS 302 as shown in FIG. 3, each having an output for a different peripheral. This register 360 thus controls through, for example, four bits logic 303 controlling the respective one of the plurality of multiplexers 302a . . . n to select the signal provided on line 318a, b as an input signal for the respective peripheral. Multiplexers 302a . . . n may have one of its multiple inputs not being connected for allowing for a default setting in which no signal is routed through the multiplexer 302a . . . n to the respective peripheral. Again, the number of bits used to encode such an assignment may vary depending on the number of available peripheral inputs.

More or less further control registers for a "virtual port" circuit may be provided depending on the implemented functions, such as for example, the signal conditioning logic 314 and/or interrupt circuit 320.

Figure 4:
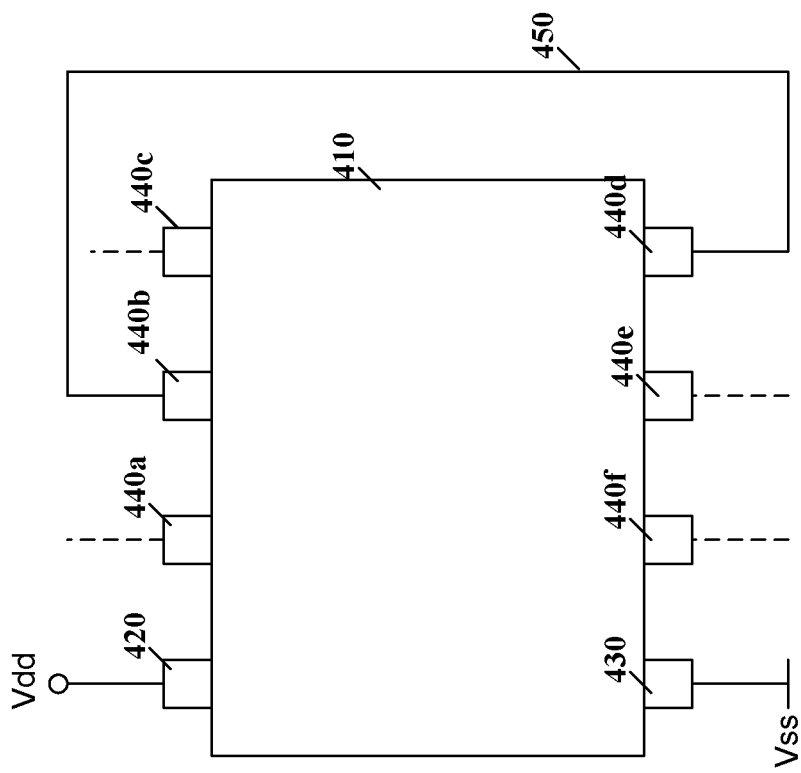
FIG. 4 illustrates a circuit including a conventional low pin microcontroller.

FIG. 4 shows a conventional microcontroller 410 as previously shown in FIG. 1 having 8 external power supply pins 420, 430, and multi-function pins 440a . . . f that provides a certain output signal only through external pin 440b. Another peripheral may require this signal at one of its inputs that is also configurable to be connected through external pin 440d. Thus, an external circuit must provide signal connection 450 to connect pins 440b and 440d. A user now loses 2 external pins that could have been available for other functionality. In case these additional 2 external pins are needed for other uses, a user must design his circuit with a different microcontroller having a higher number of external pins.

Figure 5:
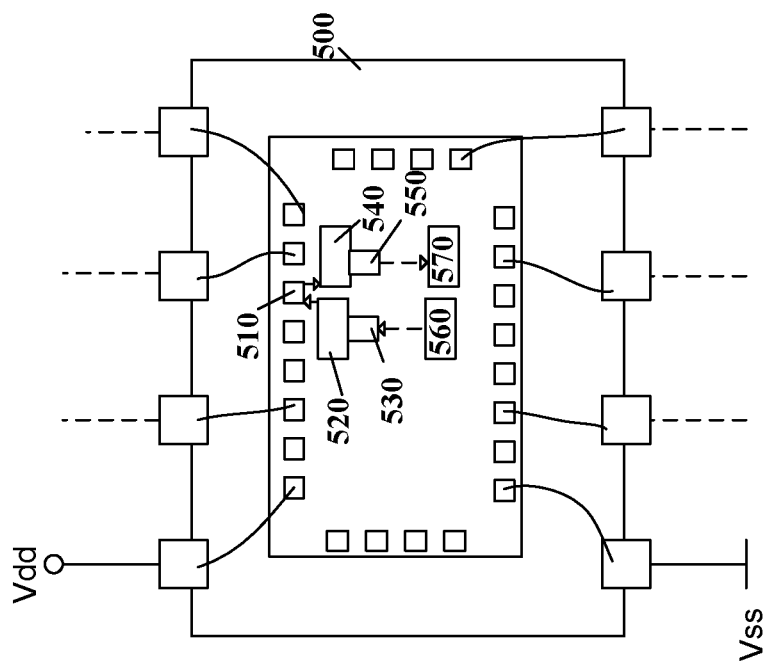
FIG. 5 illustrates a first embodiment of a microcontroller used in a similar circuit as shown in FIG. 4.

FIG. 5 shows a first embodiment of a microcontroller 500 according to the present description. This microcontroller comprises a plurality of port bits that are routed to die pads 510 which are not connected to an external pin. These pads 510 are normally disabled, for example by not providing power to the output section 520 and input section 540 of the respective I/O port circuit. During configuration of the device, the associated port bit of pad 510 is re-enabled by powering these sections 520, 540 and now operate as a "virtual port" circuit. The output section 520 and the input section 540 of the port bit is therefore coupled with the pad 510 and can now be used as a switch board for providing internal connections. FIG. 5 also shows exemplary multiplexers or PPS circuitry 530 and 550 to select and route the input signal provided by peripheral 560 to a respective selected peripheral 570 as indicated by the dashed internal connection lines.

Figure 6:
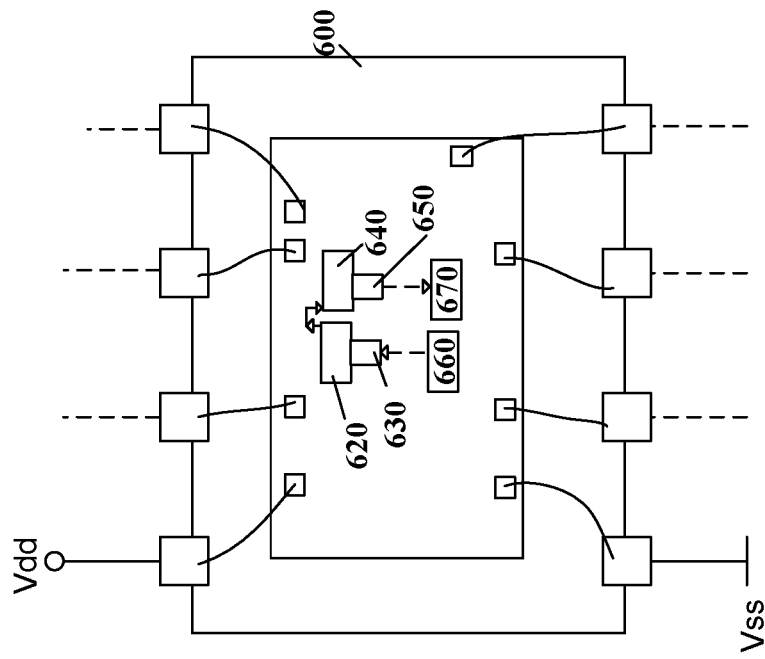
FIG. 6 illustrates a second embodiment of a microcontroller used in a similar circuit as shown in FIG. 4.

FIG. 6 shows another example in which a dedicated design of a microcontroller 600 having a low number of external pins is enhanced with a "virtual port" according to various embodiments. This design only comprises the necessary number of pads, in other words there are exactly the same number of pads and external pins. However, some designs may contain more pads for other reasons. However, the design of the die of microcontroller 600 has only the number of ports corresponding to the number of available external pins, in this example, 6 port bits and associated I/O port circuits (not shown). According to an embodiment, this design is enhanced by providing at least one additional port bit circuit that is not connected with a die pad and an external pin. The port bit circuit comprises an input section 640 and an output section 620 as well as associated multiplexers 630 and 650 of the respective virtual port. Multiplexer 630 and 650 are again preferably part of a respective PPS.

Both embodiments of FIGS. 5 and 6 may be configured as explained above with respect to FIGS. 2 and 3, in particular, with respect to the minimum requirements of a port bit design of the embodiment of FIG. 6. Both embodiments can now internally route the signals that are externally routed in the circuit shown in FIG. 4 and therefore free two additional external pins while only requiring one additional port bit circuit. A predefined number of these additional port bits that may form a "virtual port" may be implemented according to various embodiments. While particularly beneficial for low pin microcontrollers, the various embodiments disclosed can also be implemented in high pin number devices that do not provide internal routing for all input and/or output signals of various peripherals, in particular core independent peripherals. A "virtual port" thus operates as an internal switching board for internal signals of a microcontroller. The use of "virtual ports" may further allow for reducing the size of the conventional internal input selection multiplexer, for example multiplexers 210 and 270 shown in FIG. 2, which would otherwise be need as explained in the background section. These conventional input multiplexers may not need to be designed to allow for every possible connection and therefore have a reduced size because the "virtual ports" offer additional connection possibilities.

Figure 7:
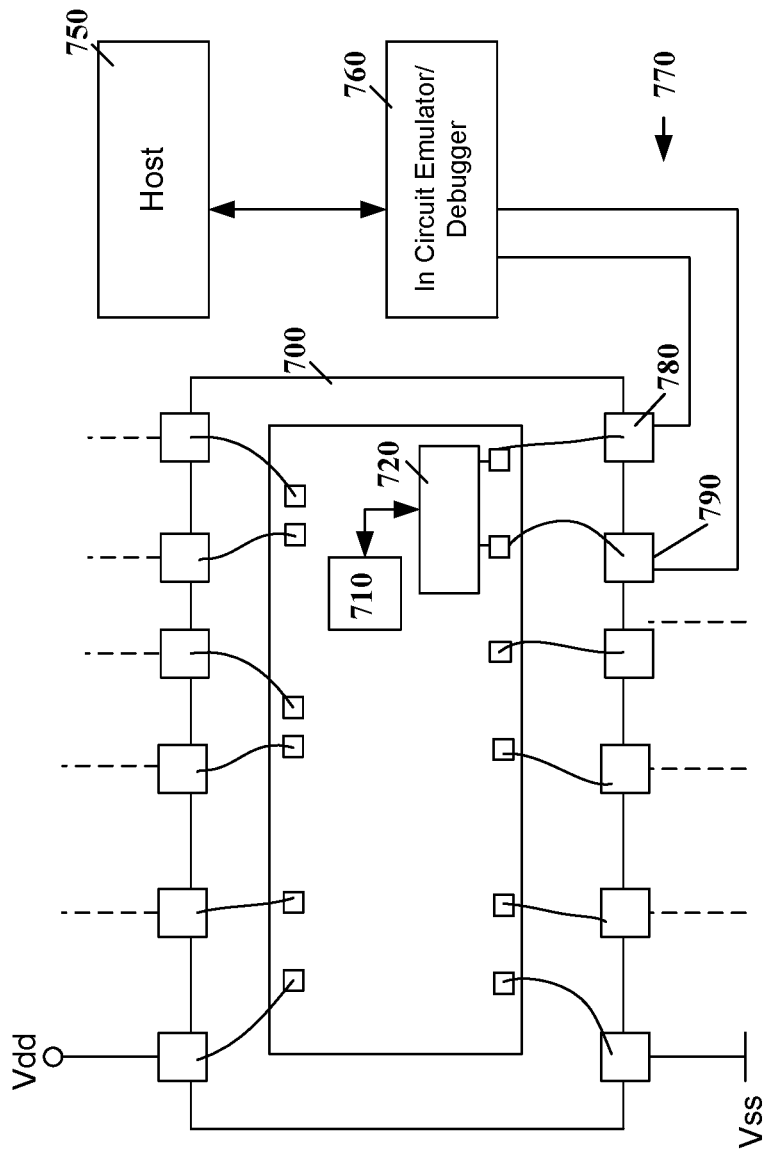
FIG. 7 shows an embodiment of microcontroller according to the present description coupled with an In-circuit Emulator and a host computer.

FIG. 7 shows another embodiment of a microcontroller 700 used in combination with an in-circuit emulator or programmer/debugger. The microcontroller can be any microcontroller according to the present description. Here, a 12-pin device is shown with an exemplary "virtual port" 710 and an integrated programmer/debugger circuit 720. The programmer/debugger circuit 720 provides for debugging capabilities of the chip as known in the art, for example, through a dedicated interface 770 using multi-function pins 780 and 790. The debugger circuit 720 has access to the "virtual port" circuit 710 and may transfer in real-time logic states of the input/output signals routed through the "virtual port" 710 to in circuit emulator/debugger 760. Thus, in-circuit emulator/debugger device 760 can receive these logic states and forward them to an integrated development environment (IDE), such as MPLAB X manufactured by the assignee of the present application. The IDE runs on a host 750 and can now provide for example a logic analyzer function of the signals routed through the various "virtual port" circuits.

Figure 8:
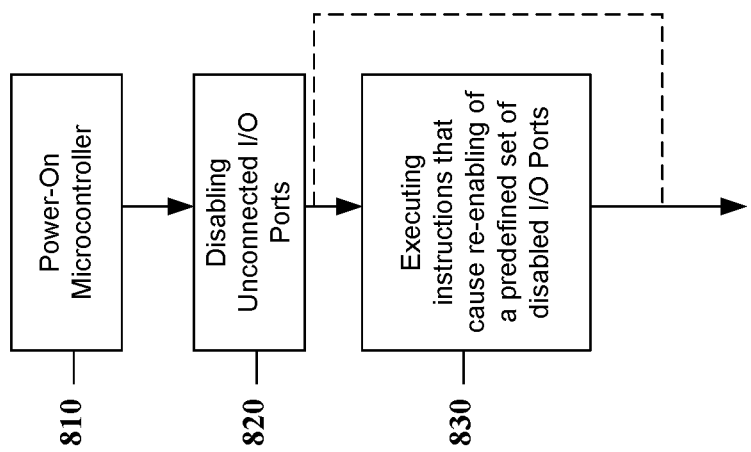
FIG. 8 shows a flow chart of power-up of a microcontroller according to various embodiments

FIG. 8 shows a flow chart of power-up of a microcontroller according to various embodiments. In step 810, a microcontroller receives through external pins a supply voltage Vdd, Vss. During step 810 the microcontroller may power-up various circuitry depending on its design. The microcontroller may be a microcontroller 102 as shown in FIG. 1 having a plurality of externally unconnected pads 106 that are coupled with respective I/O port circuitry 160 as well as bonding wire 116 in place between pads 112 and 114 as shown in FIG. 1a. In step 820, decoding logic circuit 118 is powered up and decodes the logic state of pad 112 as pulled to ground and therefore sends a signal to logic circuit 150 which disables the respective I/O circuitry 160 coupled with pads 106 that have no external connection. Disabling the unconnected I/O ports is preferably performed by not supplying a supply voltage to the I/O port circuits 160.

Other configuration of the microcontroller 102 may be performed before or after step 820. If a user does not need the unused I/O ports routing internal signals as described above, the power-up may end and the firmware as programmed within the microcontroller may be executed. However, if a user wants to use certain I/O port circuitry 160 to route internal signals, then the firmware may first execute steps 830. This step includes instructions that cause re-enabling of a predefined set of disabled I/O Ports. To this end, logic circuit 150 may include a set registers 155 that can be programmed by the CPU to re-enable the previously disabled I/O ports. Alternatively, dedicated instructions may be executed that define which ones of the disabled I/O ports are re-enabled. The firmware 840 may then further include instructions that configure the virtual ports to internally route signals as desired.

What is claimed is:

1. A microcontroller comprising in an integrated circuit package a single chip comprising a central processing unit and a plurality of peripheral units and a plurality of port bit circuits provided through at least one input/output port, wherein each port bit circuit comprises a latch for providing an output signal for the input/output port, wherein at least one port bit circuit of the plurality of port bit circuits is not connected to any of a plurality of external pins of the integrated circuit package and wherein the at least one port bit circuit is configurable to route an input signal received at the port bit circuit to a selected peripheral of the microcontroller.

2. The microcontroller according to claim 1, wherein any port bit not connected to any of the external pins of the integrated circuit package is initially disabled and can be re-enabled through configuration.

3. The microcontroller according to claim 2, comprising a configurable fuse for reenabling of a port bit.

4. The microcontroller according to claim 1, wherein the at least one port bit is connected to a die pad.

5. The microcontroller according to claim 1, wherein the input signal is provided by a bit of a bit register latch.

6. The microcontroller according to claim 1, wherein the at least one port bit circuit comprises a first multiplexer selecting the input signal.

7. The microcontroller according to claim 1, further comprising a selection circuit comprising a multiplexer controlled by a first register to select the input signal.

8. The microcontroller according to claim 1, wherein the at least one port bit circuit comprises a second multiplexer to select a destination for the input signal.

9. The microcontroller according to claim 8, wherein the second multiplexer is controlled by a second register to assign the at least one port bit circuit to a selected peripheral of the microcontroller.

10. The microcontroller according to claim 1, further comprising at least one another I/O port circuit comprising a plurality of bits, wherein at least some of the plurality of bits are assigned to external pins of the plurality of external pins of the microcontroller.

11. The microcontroller according to claim 1, wherein each latch of each port bit circuit is coupled with a tristate output driver providing an output function and an input driver, wherein each input/output port is controllable by the central processing unit through a configuration register to provide an output function of the tristate output driver or to disable the output function by putting the tristate output driver into a tristate.

12. A method for operating a microcontroller in an integrated circuit package comprising a single chip comprising a central processing unit and a plurality of peripheral units and a plurality of port bit circuits provided through at least one input/output port, wherein each port bit circuit comprises a latch for providing an output signal for the input/output port wherein at least one port bit circuit of the plurality of port bit circuits is not connected to any of a plurality of external pins of the integrated circuit packge, the method comprising:

selecting a signal source for the at least one port bit circuit;
selecting a destination for the at least one port bit circuit, whereby the at least one port bit circuit routes an input signal from the selected signal source received at the at least one port bit circuit to a selected peripheral of the microcontroller.

13. The method according to claim 12, wherein any port bit not connected to any of the external pins is initially disabled, the method further comprising:

configuring the microcontroller through at least one configuration register to enable the at least one input/output port.

14. The method according to claim 12, wherein the selected input signal source is a port latch of the at least one port bit circuit, the method further comprising:

writing a value into the port latch by the central processing unit to provide the input signal for the selected output source.

15. The method according to claim 12, wherein selecting the input source and/or selecting the destination is performed through programming of registers, wherein the registers control a first multiplexer selecting the signal source and a second multiplexer selecting the destination.

16. The method according to claim 12, wherein the microcontroller comprises a programming/debugging interface coupled with the at least one port bit circuit, the method further comprising:

coupling an in-circuit emulator/debugger device to the programming/debugging interface of the microcontroller;
detecting logic states of the input signal within the at least one port bit circuit;
forwarding the logic states to the in-circuit emulator/debugger device.

17. A microcontroller comprising in an integrated circuit package a single chip comprising a central processing unit, a plurality of peripherals and a plurality of input/output ports comprising port bit circuits, wherein each port bit circuit comprises a latch coupled with a tristate output driver providing an output function and an input driver, wherein at least one of the input/output ports comprises a plurality of bits connected to external pins of the microcontroller, wherein each input/output port is controllable by the central processing unit through a configuration register to provide an output function of the tristate output driver or to disable the output function by putting the tristate output driver into a tristate, and wherein at least one port bit circuit of the plurality of input/output ports is not connected to any of the external pins and wherein the at least one port bit circuit is configurable to route an input signal received at the port bit circuit to a selected peripheral of the microcontroller, wherein any port bit not connected to any of the external pins is initially disabled and can be re-enabled through configuration, wherein the at least one port bit circuit comprises a first multiplexer selecting the input signal and wherein the first multiplexer is coupled with a bit of said latch register and with outputs of a plurality of peripherals of the microcontroller.

18. The microcontroller according to claim 17, comprising a configurable fuse for reenabling of a port bit.

19. The microcontroller according to claim 17, wherein the at least one port bit is connected with a die pad.

20. The microcontroller according to claim 17, wherein the first multiplexer is controlled by a configuration register to provide the input signal.

21. The microcontroller according to claim 17, wherein the at least one port bit circuit comprises a second multiplexer to select a destination for the input signal.

* * * * *